United States Patent [19]

Braeger

[11] Patent Number: 4,649,604
[45] Date of Patent: Mar. 17, 1987

[54] APPARATUS FOR REMOVING A SURFACE LAYER FROM ANIMAL MUSCULAR TISSUE, PARTICULARLY FISH FILLETS

[75] Inventor: Horst Braeger, Lübeck, Fed. Rep. of Germany

[73] Assignee: Norischer Maschinenbau Rud. Baader GmbH & Co., Lubeck, Fed. Rep. of Germany

[21] Appl. No.: 790,037

[22] Filed: Oct. 21, 1985

[30] Foreign Application Priority Data

Oct. 23, 1984 [DE] Fed. Rep. of Germany ....... 3438776

[51] Int. Cl.⁴ .......................... A22B 5/16; A22C 25/17
[52] U.S. Cl. ........................................... 17/62; 17/21; 99/589
[58] Field of Search ................... 17/21, 50, 56, 62, 64; 99/537, 539, 540, 567, 584, 589

[56] References Cited

U.S. PATENT DOCUMENTS

| | | | |
|---|---|---|---|
| 1,921,440 | 8/1933 | Taylor | 17/62 |
| 3,529,318 | 9/1970 | Jobmann | 17/62 |
| 3,739,428 | 6/1973 | Bartels et al. | 17/62 |
| 4,466,344 | 8/1984 | Schill | 17/21 X |

FOREIGN PATENT DOCUMENTS 2803478 4/1979 Fed. Rep. of Germany .......... 17/62

Primary Examiner—Willie G. Abercrombie
Attorney, Agent, or Firm—Thomas R. Morrison

[57] ABSTRACT

The invention relates to an apparatus for removing a surface layer, particularly of fish fillets. On the basis of an apparatus with a skinning roller, a presser shoe facing the circumferential surface thereof while leaving a gap thereto and a skinning or paring knife, it is proposed to mount the latter on a separate knife holder in a deflectable manner against the tension of a spring and to limit the deflection path thereof by an adjustable stop. It is also proposed that the presser shoe is fitted displaceably against the tension of a spring until it engages on a further adjustable stop. Thus, on the one hand the skinning knife can be raised to a layer thickness determined by the stop and the presser shoe on the other hand is able to adapt to the resulting layer thickness while maintaining a positive conveying effect.

7 Claims, 2 Drawing Figures

APPARATUS FOR REMOVING A SURFACE LAYER FROM ANIMAL MUSCULAR TISSUE, PARTICULARLY FISH FILLETS

BACKGROUND OF THE INVENTION

1. Field of the Invention

The present invention relates to an apparatus for removing a surface layer of animal muscular tissue, particularly a fish fillet surface layer including the fish skin, the apparatus comprising a skinning roller driven in rotary manner and having a gripping circumferential surface, a paring or skinning knife whose cutting edge faces said circumferential surface, and a presser surface positioned equidistantly of the circumferential surface.

2. Prior Art

The prior art discloses several apparatus for this purpose.

E.g. German Patent No. 21 36 038 discloses a machine for removing the rind from hams or the like. This machine is provided, above its derinding knife, carried by a presser shoe, with a second blade for the simultaneous cutting off of a fat side from the rind-removed ham. This second blade can be set to different longitudinal inclinations with respect to the rind-removing knife and its mounting, together with the presser shoe, is pivotably arranged in such a way that the presser surface of the presser shoe is displaceable under a radial component and the cutting edge of the second blade is displaceable under a tangential component with respect to the skinning roller. When using this apparatus, the rind is removed from the ham to be processed and simultaneously a separate fat slice is obtained.

When skinning fish fillets, particularly of those fish having a dark-coloured layer of pasty consistency between the skin and the muscular flesh, such as e.g. pollock (pollachius) and hake (marluccius), it is desirable to produce fillets which are free from this layer.

Corresponding machines are in use. It is a fundamental feature thereof that they have, in accordance e.g. with German Patent No. 17 53 121, a driven refrigerating freezing drum disclosed for the first time in U.S. Pat. No. 1,921,440. For the purpose of a reliable transport of the fish fillets to be processed their skin sides are frozen onto this drum against the resistance caused by the skinning knife.

As a result of the high constructional and energy costs linked with this concept, many efforts have been made over the years to find a less complicated and costly system which, at the same time, is suitable to be integrated into a filleting line of the presently standard performance level.

Due to its simplicity, attention has been concentrated on the presser shoe - stationary knife principle. However, up to now the efforts have not met with the necessary success, because any manipulation on the presser shoe or knife either has a negative influence on the critical cutting phase and/or in general the reliability of the passage of the fillet. It is for this reason that the principle of the first-mentioned prior art has failed in the processing of fish fillets and in addition the separately produced material layer having no internal cohesion leads to premature clogging of the machine.

3. Object of the Invention

It is therefore a primary and essential object of the present invention to find and suggest a concept which is free from the above deficiencies.

SUMMARY OF THE INVENTION

Based on the fish fillet skinning apparatus disclosed in German Patent No. 28 03 478, in which a presser surface provided at its apex with a blade serving as a paring or skinning knife and a catching face located above the same are used, a solution of this problem which is in all respects satisfactory has been found. It is based on the fact that both the skinning knife and the presser surface are arranged so as to permit deflection independently of one another counter to the tension of a spring and substantially radially with respect to the skinning roller and that fixed, adjustable stops are provided for limiting the respective deflections of the paring knife and the presser surface.

The key to the successful solution of the set problem was based on the finding that the presser surface and the skinning knife in each case have functions which can only be fulfilled in an optimum manner, if each of these components is independently adjustable and mutual influencing is prevented. It has been found that reliable cutting can only be obtained if the presser surface and also the paring or skinning knife are positioned at a limited distance from the skinning roller, at least in the initial cutting phase. Due to the fact that the skinning knife may have a land or bevel facing the circumferential surface of the skinning roller which land forms an acute angle opening against the rotary direction of the skinning roller with the imaginary tangent placed on the circumferential surface in the vicinity of the land, following the initial cutting phase there is an automatic setting (adjusting) of the paring knife to the layer thickness set by means of the corresponding stop.

In order to keep the separated layer connected to the skin, the entrance end of the presser surface is blunt and is set back in the rotary direction of the skinning roller by 3 to 6 mm with respect to the skinning knife blade.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENT

Figure 1:
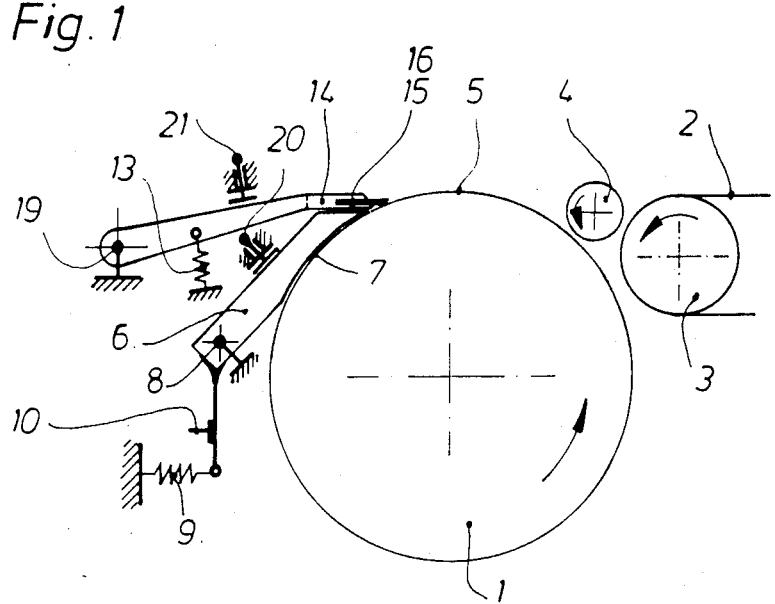
FIG. 1 shows a cross-section through the device according to the invention in the inoperative position.
Figure 2:
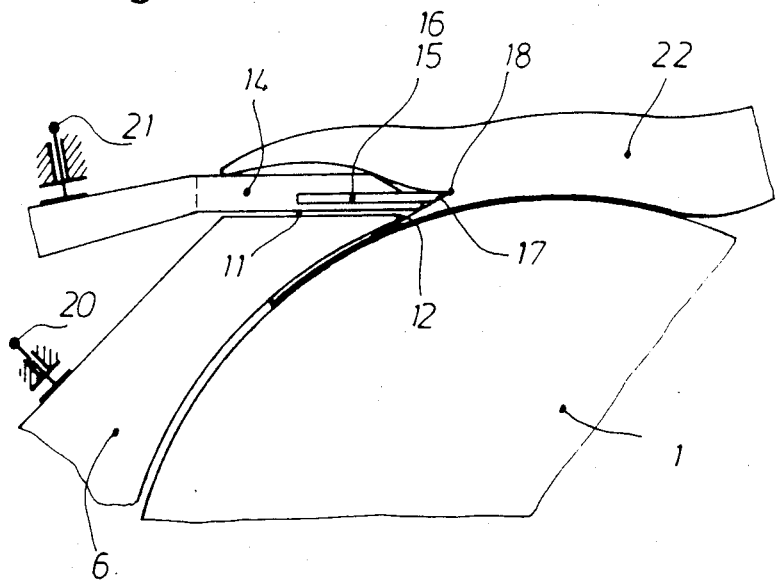
FIG. 2 shows a partial cross-section on a larger scale just after the cutting phase has commenced.

A driven, rotary skinning roller 1 is arranged in a not shown frame of a skinning machine of the presser shoe - stationary blade type. Roughly in the plane of the highest point of the skinning roller and upstream thereof there is arranged a driven conveyor belt 2 deflected about a guide roller 3 and to which is associated a transition roller 4 in the transition wedge between the skinning roller 1 and the guide roller 3. The skinning roller 1 is provided with a gripping and preferably longitudinally grooved circumferential surface 5 equidistantly facing and opposing a presser surface 7 of a presser shoe 6 on the discharge side of the roller 1. The presser shoe 6 is pivotable about an axis 8, which allows a substantially radial pivotal movement. A spring 9 ensures that the presser surface 7, intercepted by a stop 10 faces the circumferential surface 5 at a limited distance therefrom, but not in contact therewith. At its highest point presser shoe 6 is provided with a flattened portion 11, which extends substantially horizontally and whose transition into the presser surface 7 is constructed as a blunt edge 12. Above flattened portion 11 and held resting thereon with its entire surface by its underside in the inoperative position by means of a spring 13 is provided a knife holder 14 having a blade 16 inserted in an appropriate clamping manner, which blade is effective as a skinning or paring knife 15, has a cutting edge 18 and is provided with an inner land or bevel 17. The knife holder 14 is mounted so as to pivot about an axis 19 and is so arranged that the cutting edge 18 is positioned upstream of edge 12 of presser shoe 6 by an amount of approximately 3 mm, viewed counter to the rotary direction of skinning roller 1. Adjustable stops 20 and 21 ensure a limitation of the pivoting movements of presser shoe 6 and knife holder 14, respectively, directed counter to the tension of springs 9 or 13, respectively.

The operation of the apparatus will be described hereinafter relative to the passage of a fish fillet through the machine. A fillet 22 to be processed is placed onto the conveyor belt 2, preferably tail first and with the skin side downwards, and is conveyed by said belt and supported by the transition roller 4 onto the circumferential surface of skinning roller 1, which supplies it to the skinning or paring mechanism. Due to the longitudinal grooves covering circumferential surface 5, the fillet is in a position to firstly pass under the very sharp skinning or paring knife 15 and move by the edge 12 of presser shoe 6 into the gap between presser surface 7 and the circumferential surface 5 of skinning roller 1. The pressing force acting from this time onwards on the fillet parts which have entered the gap and emanating from spring 9, as a result of the impressing of circumferential surface 5 into the skin of fillet 22 brings about a positive conveyance thereof, so that the paring process starts. Due to the wedge formed between land 17 and the circumferential surface 5 of skinning roller 1, the paring knife 15 is subject to a lifting force (upward pressure), which is limited by the stop 21 set to the desired layer thickness. The layer having a greater thickness and separated from the fillet is now penetrating the gap between presser surface 5 and skinning roller 1 and leads to the raising of the presser shoe until the latter strikes against stop 20, which has been adjusted so as to maintain the positive conveying action, so that finally the entire fillet surface is subject to the skinning or paring process. Whilst the skinned fillet slides over the knife holder 15, the surface layer including the skin is detached from the skinning roller 1 by a suitable stripping means positioned below the presser shoe 6 and is removed as waste.

What is claimed is:

1. Apparatus for skinning fish fillets comprising:
   a rotatable skinning roller rotatable in a direction and having a circumferential surface including a gripping surface adapted for gripping said fish fillets;
   a skinning knife;
   a cutting edge on said skinning knife;
   first pivoted means for disposing said skinning knife with said cutting edge disposed at a first movable radial distance from said circumferential surface;
   a presser shoe;
   a presser surface on said presser shoe facing said circumferential surface downstream of said cutting edge in said direction;
   second pivoted means for disposing said presser surface at a second movable radial distance from said circumferential surface;
   first stop means for limiting a maximum value of said first radial distance;
   second stop means for limiting a minimum value of said second radial distance; and
   means for urging said skinning knife away from said circumferential surface toward said maximum value of said first radial distance in response to the passage of said fish fillet past said cutting edge.

2. An apparatus as claimed in claim 1, wherein said means for urging includes a land on said skinning knife, said land having a land surface facing said circumferential surface, said land surface forming an acute angle with an imaginary tangent placed on said circumferential surface adjacent to said land, said acute angle opening against said direction.

3. An apparatus as claimed in claim 1, wherein said presser shoe includes a feedside end directed against said direction said feedside end being blunt and being set back by 3 to 6 mm from said cutting edge in said direction.

4. An apparatus as claimed in claim 2, wherein said presser shoe includes a feedside end directed against said direction said feedside end being blunt and being set back by 3 to 6 mm from said cutting edge in said direction.

5. An apparatus as claimed in claim 1, further comprising:
   first resilient means acting on said first pivoted means for urging said cutting edge toward said circumferential surface; and
   second resilient means acting on said second pivoted means for urging said presser surface toward said circumferential surface.

6. An apparatus as claimed in claim 1, further comprising third stop means for limiting a maximum value of said second radial distance.

7. An apparatus as claimed in claim 1, further comprising a portion of said presser shoe contactable by said skinning knife, contact between said portion and said skinning knife being effective for limiting a minimum value of said first radial distance.

* * * * *